Jan. 5, 1965   J. E. SHERLOCK   3,164,203
GAS BURNERS WITH SAFETY CUT-OFF
Filed April 3, 1961

INVENTOR
John Edward Sherlock
Morris Bateman
ATTORNEYS 3,164,203
GAS BURNERS WITH SAFETY CUT-OFF
John E. Sherlock, Shepperton, England, assignor to The British Thermostat Company Limited, Sunbury-on-Thames, England, a British company
Filed Apr. 3, 1961, Ser. No. 100,201
Claims priority, application Great Britain Apr. 7, 1960
4 Claims. (Cl. 158—140)

This invention relates to gas burners of the kind in which a safety device is provided comprising a thermally sensitive element and a valve member actuated thereby to interrupt the flow of gas in the event of the flame becoming extinguished.

The principal object of the invention is to facilitate the installation and maintenance of such a burner particularly in a refrigerator.

According to the invention the thermostatically-operated valve is disposed at one end of a mixing tube fixed to the burner which can be readily removed with the burner for cleaning, and the thermostatic control for the valve includes a thermally sensitive element in contact with the base of the burner and acting on the valve through an arm extending parallel with the tube.

Figure 1:
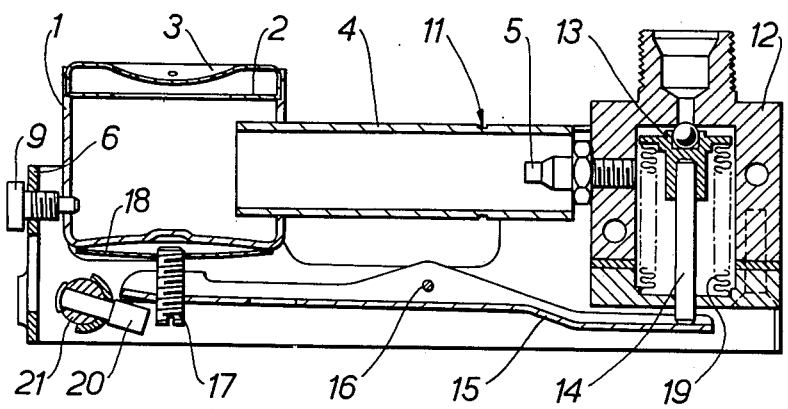
Figure 2:
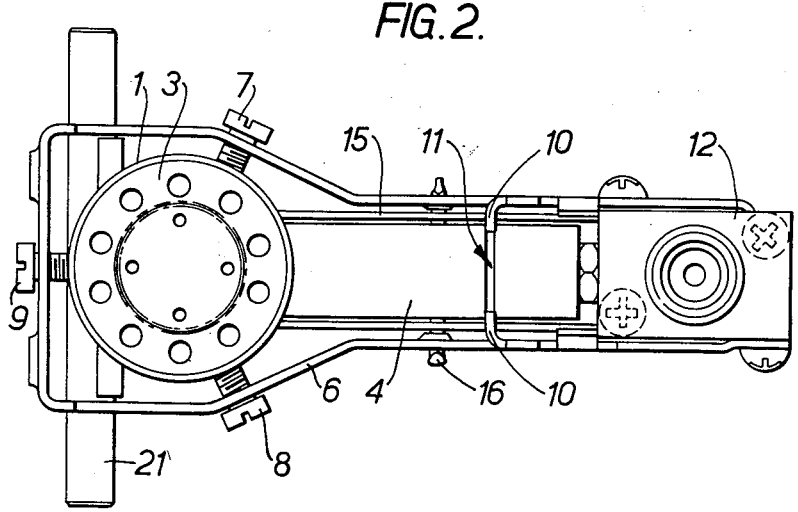

An embodiment of the invention will now be described by way of example with reference to the accompanying drawings of which:

FIG. 1 is a sectional elevation of a combined burner and thermostatically operated valve, and FIG. 2 is a plan view of the device shown in FIG. 1.

In accordance with the described embodiment of the invention, the burner comprises a substantially cylindrical pot 1 having at the top an annular mixing disc 2 above which is an apertured burner head 3. Through an aperture in the wall of the pot passes one end of the mixing tube 4 which extends radially from the pot and is fixed thereto. At its other end, this tube surrounds a jet 5 extending horizontally from the gas valve, the gas thus passing horizontally through the tube to the burner pot. The latter rests in a frame 6 in which it is held by two screws 7 and 8 engaging in dimples in the side of the pot and a third screw 9 passing through a hole in the side of the pot. By loosening these screws the pot can be lifted out for cleaning and in order to allow the mixing tube to be removed with the pot the other end of the tube rests in vertical guides 10 in the frame, these guides engaging with a circumferential groove 11 in the tube. Thus the loosening of the three screws 7, 8 and 9 permits the burner and tube to be easily withdrawn.

The gas jet 5 projects from a vertical block 12 containing a vertically disposed spring-loaded valve 13. This valve has a central push-rod 14 engaging one end of an operating arm 15 horizontally pivoted in the frame at 16 and extending parallel to the mixing tube 4. The other end of the arm carries a screw 17 which is screwed into the centre of a thermally sensitive element in the form of a snap-action bi-metallic disc 18 in contact at its edges with the bottom of the pot. FIGURE 1 shows the bi-metallic disc in the valve closing position it assumes when the burner is cold. It will be appreciated that the operation of the device so far described is that the deflection of the bi-metallic disc 18 in response to the heating of the pot maintains the gas valve open and the occurrence of flame failure causes the valve to be closed by the deflection of the bi-metallic disc in the opposite sense. The deflected bi-metallic disc 18 functions to spring load valve 13 through lever 15 and push rod 14.

The valve is sealed against leakage of gas by a bellows 19 and is preferably of the ball type as shown.

In order to enable the burner to be lit, the bi-metallic disc 18 must be deflected to enable the valve to open and admit gas. This would normally be achieved by applying a lighted taper or the like to the burner and thereby heating it until the disc snapped into its "valve open" position. In order to shorten the time necessary to perform this operation, there is provided a means for mechanically urging the disc 18 into the "valve open" position. This consists of a pin 20 which projects radially from a spindle 21 pivoted in the frame on the opposite side of the pot from the valve and tube. The free end of the pin 20 acts directly on the operating arm 15, so that rotation of the spindle 21 causes the pin to move and force the bi-metallic disc into the "valve open" position. Lighting is achieved by operating the spindle to open the valve and then applying a flame or spark to the burner. The valve must be held open in this way until the bi-metallic disc has been heated sufficiently to allow it to remain in its "valve open" position. The time required for this operation is less than that for the earlier method by an amount equivalent to the temperature differential of the bi-metallic disc. The spindle 21 can be operated by a push-rod or a cord or alternately, may carry a knob.

The assembly described is very compact and may be readily installed in the limited vertical space obtainable in the base of a refrigerator.

I claim:

1. In a gas burner assembly characterized by a gas burner connected by a mixing tube to a valve that controls supply of gas through the tube to the burner, an operating member for the valve, a pivotally mounted motion transmitting arm having one end operably connected to said valve operating member and extending between the valve operating member and said burner, and thermally sensitive means for closing said valve when the burner is not ignited comprising a flexible bi-metallic element mounted on the opposite end of said arm in contact with said burner so as to be deflected in one direction by heat from said burner to exert a valve opening action through said arm and said member when the burner is ignited and at operating temperature, said element when said burner becomes cool deflecting in the opposite direction and reacting against said burner to exert a valve closing force through said arm and said valve operating member.

2. In the gas burner assembly defined in claim 1, the provision of manually operable means for deflecting said bi-metallic element into the position it assumes when heated to allow the burner to be ignited and attain said operating temperature.

3. A gas burner assembly comprising a support, a hollow burner removably mounted on said support, means including a valve on said support for supplying gas to said burner, an arm pivoted on said support with one end operably connected to said valve and the other end adjacent said burner, and a deflectable dish-shaped snap-acting flexible bimetallic element mounted on said other end of the arm with its concave surface peripherally contacting a wall of said burner, said element being responsive to heat from the burner and adapted when the burner is hot to deflect its center toward said wall and cause said arm to rock toward valve opening position and hold there, and being adapted when said burner is cool to deflect its center oppositely away from the burner wall to rock said arm toward valve closing position.

4. In the gas burner assembly defined in claim 3, manual means for rocking said arm toward valve opening position against the resistance of said element to permit initial ignition of said burner.

References Cited in the file of this patent

UNITED STATES PATENTS

| | | |
|---|---|---|
| 784,433 | Roberts | Mar. 7, 1905 |
| 1,461,034 | Frisbie | July 10, 1923 |
| 1,711,403 | Boger | Apr. 30, 1929 |
| 1,735,475 | Sladky et al. | Nov. 12, 1929 |
| 1,865,901 | Grentz | July 5, 1932 |
| 1,885,530 | Maracib | Nov. 1, 1932 |
| 1,986,304 | Taylor | Jan. 1, 1935 |
| 2,049,959 | Jones et al. | Aug. 4, 1936 |

FOREIGN PATENTS

| | | |
|---|---|---|
| 235,014 | Great Britain | June 11, 1925 |
| 360,333 | Great Britain | Nov. 5, 1931 |
| 364,522 | Great Britain | Jan. 7, 1932 |
| 428,119 | Italy | Dec. 5, 1947 |
| 809,661 | Germany | Aug. 2, 1951 |
| 1,180,831 | France | Jan. 5, 1959 |